United States Patent
Hood et al.

(10) Patent No.: US 8,960,707 B2
(45) Date of Patent: Feb. 24, 2015

(54) PIVOTING TOW HOOK

(71) Applicants: Michael Hood, Logan, OH (US);
Robert Gruschow, Northville, MI (US);
Wes Holmes, Mesa, AZ (US)

(72) Inventors: Michael Hood, Logan, OH (US);
Robert Gruschow, Northville, MI (US);
Wes Holmes, Mesa, AZ (US)

(73) Assignee: Amanda Belt-Bolt Company, Logan, OH (US)

( * ) Notice: Subject to any disclaimer, the term of this patent is extended or adjusted under 35 U.S.C. 154(b) by 0 days.

(21) Appl. No.: 14/227,657

(22) Filed: Mar. 27, 2014

(65) Prior Publication Data
US 2014/0265250 A1    Sep. 18, 2014

Related U.S. Application Data

(63) Continuation-in-part of application No. 13/838,646, filed on Mar. 15, 2013.

(51) Int. Cl.
*B60D 1/18*    (2006.01)
*F16B 45/00*   (2006.01)

(52) U.S. Cl.
CPC ..................................... *B60D 1/187* (2013.01)
USPC ............................ 280/495; 280/480; 248/304

(58) Field of Classification Search
CPC ............ B60D 1/04; B60D 1/18; B60D 1/182; B60D 1/185; B60D 1/187; B60D 1/488; B60D 1/52; B60D 1/565
USPC ......... 24/114.5, 115, 128, 129; 248/304, 305, 248/307, 339, 340; 280/480, 480.1, 495; 294/26, 82.1, 902, 904; 403/206, 213
See application file for complete search history.

(56) References Cited

U.S. PATENT DOCUMENTS

| | | | | |
|---|---|---|---|---|
| 735,445 A | * | 8/1903 | Banks | 24/698.1 |
| 1,476,627 A | * | 12/1923 | Luebke et al. | 294/82.1 |
| 1,484,495 A | * | 2/1924 | Hatherley | 294/26 |
| 1,572,347 A | * | 2/1926 | Beck | 24/598.5 |
| 1,889,633 A | * | 11/1932 | Butterworth | 24/116 R |
| 2,165,377 A | * | 7/1939 | Henry | 24/116 R |
| 2,827,307 A | * | 3/1958 | Osborn | 280/416.3 |
| 3,205,545 A | | 9/1965 | Ring | |

(Continued)

OTHER PUBLICATIONS

Tiger Industrial Inc., "Check out the New Billet Aluminum Tiger Claw!" [Online]. Apr. 30, 2009 [retrived on Feb. 7, 2009]. Retrieved from the Internet: <URL: https://web.archive.org/web/20090430234129/http://www.tigerhitch.com/products.htm>.

(Continued)

*Primary Examiner* — Joseph Rocca
*Assistant Examiner* — Marc A Scharich
(74) *Attorney, Agent, or Firm* — Hahn Loeser & Parks LLP; Arland T. Stein

(57) ABSTRACT

Disclosed is a tow adapter for coupling a device to be towed to a towing vehicle. The tow adapter includes a bracket adapted to be attached to the towing vehicle, a loop suitable to support a tether to enable the towing vehicle to tow the device to be towed, the loop having a first end and a second end portion each mounted to the bracket about a pivot such that the loop pivots relative to the bracket, the bracket including stops extending outwardly there from which limit an extent of travel of the loop about the pivot when the loop makes contact with the stops, and a hook mounted to the bracket and at least a portion of the hook capable of being disposed centrally within the loop. The tether may be threaded through the loop and attached to the hook to enable the towing vehicle to tow the device to be towed.

11 Claims, 2 Drawing Sheets

(56) References Cited

U.S. PATENT DOCUMENTS

| | | | | |
|---|---|---|---|---|
| 3,729,926 | A | * | 5/1973 | Buske ................................ 59/93 |
| 4,426,100 | A | * | 1/1984 | Yamabe et al. ............... 280/770 |
| 4,700,917 | A | * | 10/1987 | Dillman ..................... 248/227.4 |
| 4,858,977 | A | * | 8/1989 | Mitchell ...................... 294/82.1 |
| 5,997,063 | A | * | 12/1999 | McCraw ...................... 294/82.1 |
| 6,536,794 | B2 | * | 3/2003 | Hancock et al. .............. 280/511 |
| 6,672,609 | B2 | * | 1/2004 | Pierman et al. ............... 280/504 |
| 6,712,379 | B2 | * | 3/2004 | Graham et al. ............... 280/480 |
| 7,758,060 | B2 | * | 7/2010 | Lopez et al. .................. 280/495 |
| 7,823,942 | B1 | * | 11/2010 | McCraw et al. ............. 294/82.1 |
| 7,862,066 | B2 | * | 1/2011 | Smith ........................ 280/416.1 |
| 7,871,097 | B2 | * | 1/2011 | Sparkes et al. ................ 280/480 |
| 8,636,297 | B2 | * | 1/2014 | Merten et al. ................. 280/504 |
| 2002/0140206 | A1 | * | 10/2002 | Lloyd ........................ 280/491.5 |
| 2007/0045985 | A1 | | 3/2007 | Markley |
| 2009/0108566 | A1 | | 4/2009 | Asjad |
| 2009/0278333 | A1 | | 11/2009 | Lopez et al. |

OTHER PUBLICATIONS

International Search Report PCT/US/14/27068 Mailed Jul. 30, 2014.

* cited by examiner

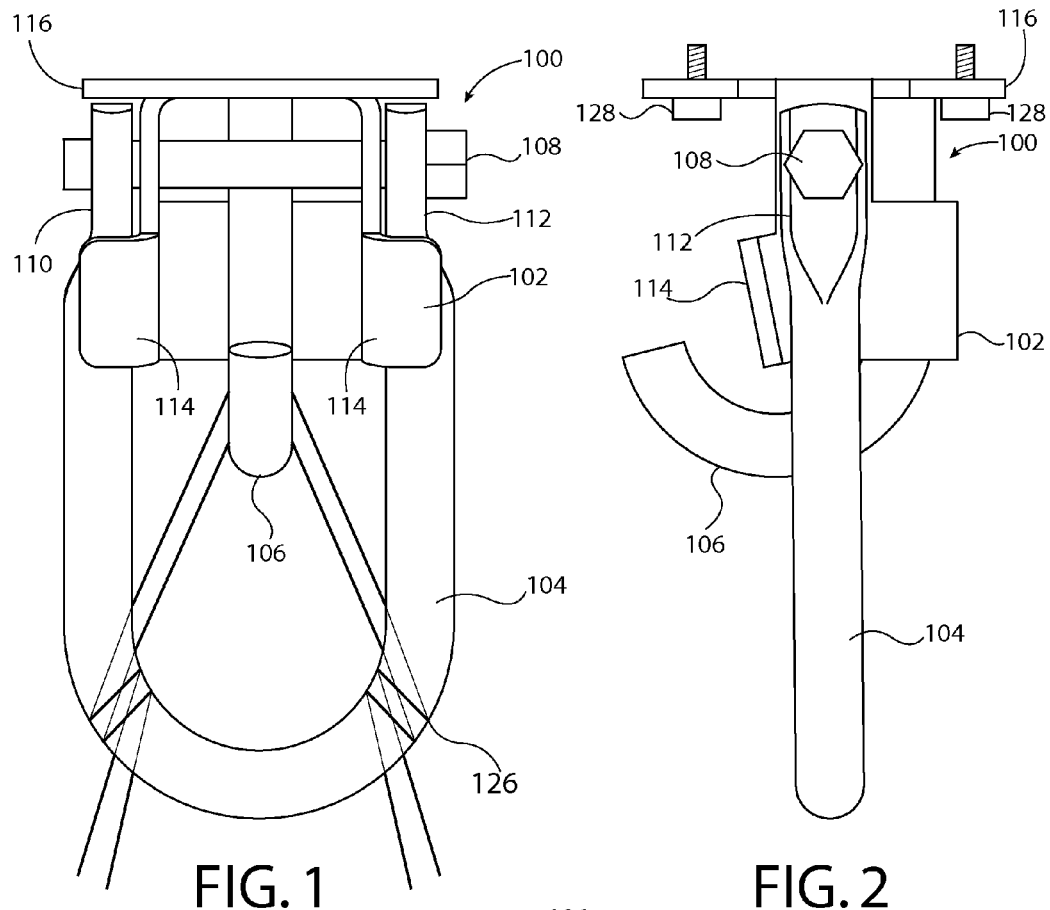
FIG. 1
FIG. 2
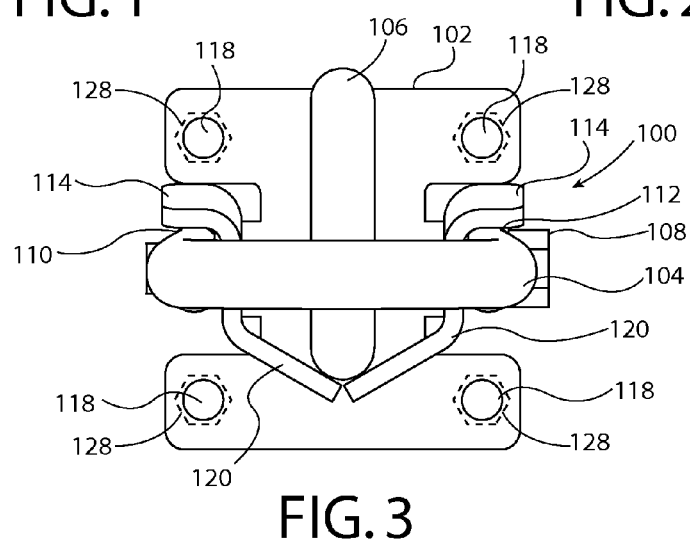
FIG. 3

PIVOTING TOW HOOK

The present application is a continuation-in-part of and claims priority to U.S. application Ser. No. 13/838,646 filed Mar. 15, 2013 the contents of which are hereby incorporated in its entirety.

BACKGROUND AND SUMMARY

This invention is directed to a novel tow hook for securing a device to be towed to a towing vehicle. More specifically, described is a novel tow hook for securing a device to be towed to a towing vehicle having a loop and hook for securing a tether where one of the loop and hook are pivotable relative to the other.

One common method of coupling a towing vehicle to a device to be towed is by means of a tether, such as a chain, strap, rope or the like. Various tow adapters for coupling towing vehicles to devices to be towed by a tether have been proposed in the prior art. These prior art devices do not allow for attaching the tether to the towing adapter securely, requiring the tether to be tied or otherwise attached to the tow adapter. Moreover, these prior art tow adapters are not flexible and receptive to facilitate towing.

It may often be desired to use a single attachment, such as a hook or loop, for coupling a tether to the towing vehicle. In other situations, it is desired to use multiple attachment points, such as a hook and loop attachment structure. It is therefore desirous to have a tow hook system that is capable of selectively accommodating a tether secured to a hook, loop, or combination of the two.

Disclosed is a tow adapter for coupling a device to be towed to a towing vehicle. The device comprises a bracket adapted to be attached to a vehicle to support a tow adapter; a loop suitable to support a tether to enable the towing vehicle to tow a device to be towed, the loop having a first end portion and a second end portion each adapted to be mounted to the bracket; a hook positioned central of the loop and pivotable relative to the loop; and the hook and loop are adapted to enable a tether to thread through the loop and attach to the hook.

According to a first alternative embodiment, the loop may be secured to the bracket and the hook pivots relative to the bracket. In another embodiment, the hook is secured to the bracket and the loop pivots relative to the bracket.

The tow adapter may include a pin or threaded rod adapted to provide the pivot between the loop and hook.

The bracket of the tow adapter may be alternatively a single stamped piece having a portion providing stops for the loop or hook; or may be a welded assembly including a stop for at least one of the loop or hook.

Also disclosed in this application is a kit for a tow adapter suitable for coupling a device to be towed to a towing vehicle. The kit includes a bracket securable to the towing vehicle, the bracket includes a U-shaped loop having opposite first and second end portions for receiving a tether for towing the device to be towed and a hook central of the opposite first and second end portions. The hook is pivotable relative to the loop. The kit also includes fasteners suitable to fasten the bracket to the vehicle.

In one embodiment, the kit includes a tether, such as a chain or strap, for coupling the device to be towed to the towing vehicle.

In various other embodiments, the bracket is a single stamped piece having a portion providing stops for the loop or hook. Further to this embodiment, the loop may pivot relative to the bracket. In further aspects, the first and second end portions each include an opening for receiving a pin and the kit further includes said pin. The pin may be a threaded rod.

In another embodiment, the bracket comprises a welded assembly. Further to this embodiment, the hook pivots relative to the bracket. The hook pivots about a pin or threaded. The hook may be secured to the pin and includes a stop for limiting rotation of the hook about the pin.

Finally disclosed is a method for securing a device to be towed to a towing vehicle. The method includes the steps of assembling a tow adapter having a loop suitable to support a tether to enable the vehicle to tow a device to be towed, the loop having a first end portion and a second end portion attached to a bracket and a hook attached to the bracket central of the loop, the loop and hook pivotable relative to one another; attaching the bracket to the vehicle; and attaching a tether to the device to be towed, threading the tether over and through the loop, and attaching the tether to the hook.

In various alternative embodiments of this method, the hook may be pivotable relative to the bracket, or the loop may be pivotable relative to the bracket.

BRIEF DESCRIPTION OF DRAWINGS

FIG. 1 is a top view of a tow adapter according to a first embodiment;

FIG. 2 is a side view of the tow adapter according to the first embodiment;

FIG. 3 is a front view of the tow adapter according to the first embodiment;

DETAILED DESCRIPTION

Figure 4:
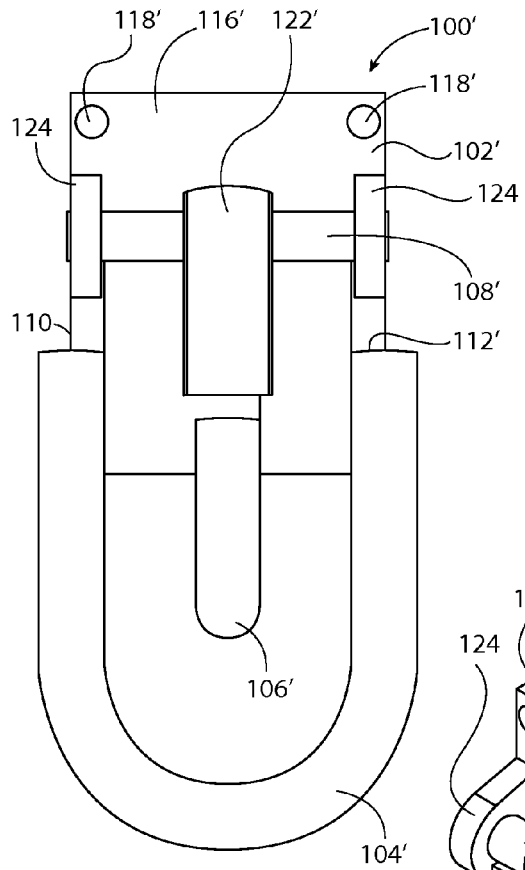
FIG. 4 is a top view of a tow adapter according to a second embodiment.
Figure 5:
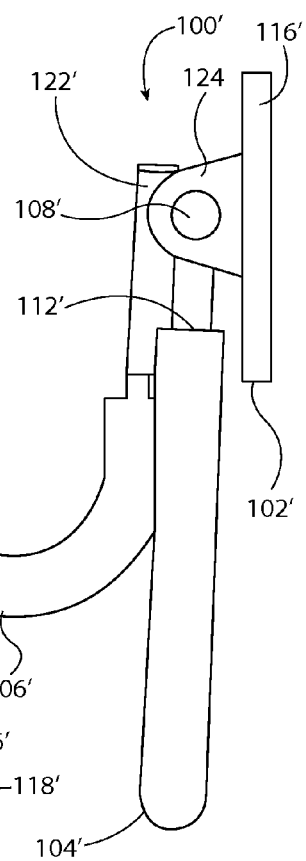
FIG. 5 is a side view of the tow adapter according to the second embodiment.
Figure 6:
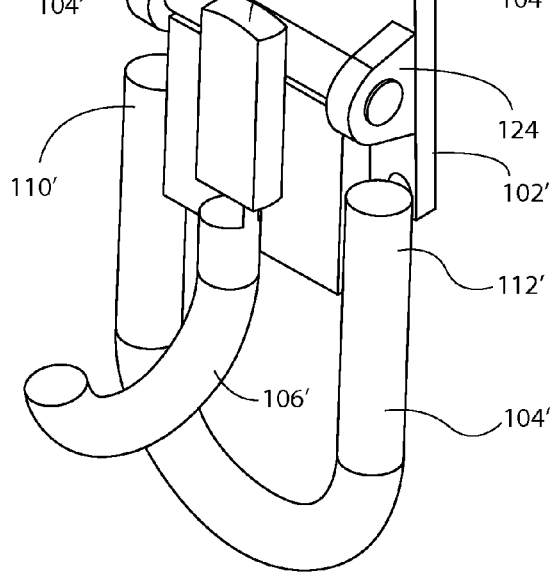
FIG. 6 is a perspective view of the tow adapter according to the second embodiment.

Various embodiments of the pivoting tow hook are illustrated in FIGS. 1-6. A first embodiment of the pivoting tow hook is illustrated in FIGS. 1-3, while a second embodiment of the pivoting tow hook is illustrated in FIGS. 4-6. The pivoting tow hook is provided to allow a towing vehicle to couple to a device to be towed by means of a tether, such as a chain, strap, rope, or other flexible length.

According to the embodiment illustrated in FIGS. 1-3, a pivoting tow hook 100 is provided. The pivoting tow hook 100 includes a bracket 102 for securing the tow hook to a towing vehicle, a loop 104 for receiving a tether 126, and a hook 106 for securing the tether 126. The embodiment illustrated in FIGS. 1-3 further includes a pin 108 which may be a threaded rod, such as a bolt, a solid rod, or some other type of fastener.

According to the illustrated embodiment, the loop 104 includes opposite first 110 and second 112 end portions. Each of the opposite end portions 110, 112 includes an opening for receiving the pin 108, allowing the loop 104 to freely pivot about the pin 108. The bracket 102 further includes stops 114 limiting the travel of the loop 104.

The bracket 102 according to the first embodiment is manufactured by stamping a single piece of metal to form the desired shape. This shape includes a backplate 116 for securing the bracket 102 to the towing vehicle, with integral mounting holes 118 for receiving fasteners 128 or the like. The bracket also includes a base 120 for supporting the hook 106. According to the first embodiment, the hook 106 is welded to the base 120 of the bracket 102 and immovable relative thereto. Finally, the bracket 102 includes stops 114 for limiting the travel of the loop 104 about the pivot. As illustrated in FIG. 2, these stops 114 are positioned so that the loop 104 can be moved from a flush position parallel to the backplate 116 and a normal position perpendicular to the backplate 116. In the flush position, only the hook 106 is available for securing the tether 126 while in the normal position both the hook 106 and loop 104 are positioned to receive the tether 126.

Further according to this first illustrated embodiment, the pin 108 is removable. The pin 108 may be, for example, a bolt or other type of screw fastener secured either by a separate fastener (such as a nut) or one of the end portions 110, 112 of the loop 104 may be threaded to receive the pin 108. Alternatively, the pin may be a solid or hollow, non-threaded length of metal, secured by means well known in the art, such as a cotter pin, split pin, retaining pin, spring clip, or the like. The pin 108 is designed to be easily removed with appropriate tools, such as a wrench (for a threaded rod) or spring clip pliers (for a pin and spring-clip assembly) and replaced without requiring additional tools, such as a welding device. This arrangement allows for the loop 104 to be removed from the tow hook 100 by a consumer or end-user, so that the hook 106 may be used in a stand-alone arrangement.

A second arrangement of the pivoting tow hook is illustrated in FIGS. 4-6 and designated generally 100'. According to this embodiment of the invention, the tow hook 100' includes a bracket 102', a loop 104', a hook 106', and a pin 108'. The loop 104' includes opposite first 110' and second 112' end portions secured to the bracket. The pin 108' is designed to pivot relative to the loop 104' and bracket 102'. The hook 106' includes a base 122' that is attached to the pin 108', such as by welding. The base of the hook 122' extends on opposite sides of the pin 108' and provides a stop against further travel of the hook 106'.

Further according to this embodiment, the bracket 102' includes a backplate 116' with integrally formed mounting holes 118' for attaching the bracket 102' to the towing vehicle. The bracket also includes side plates 124 for holding the pin 108' in position. These side plates 124 are welded to the backplate 116' and allow the pin 108' to pivot freely.

The loop 104' includes opposite first 110' and second 112' end portions, these opposite end portions may be secured to the bracket 102' so that the hook does not pivot relative to the bracket 102'.

In the illustrated embodiment, the hook 106' is movable between a first position where the hook and loop together are used for securing a tether and a second position where the loop alone is used for securing the tether.

In various other aspects of the invention, the hook 106' and loop 104' may both pivot, either together (such as shown in FIG. 5) or separately, relative to the bracket 102'.

Also disclosed in this application is a method for securing a device to be towed to a towing vehicle. This method includes the steps of assembling a tow adapter, attaching the tow adapter to a vehicle, attaching a tether to the device to be towed, and securing the tether to the tow adapter.

According to the first step of the method, a tow adapter is assembled. In a first embodiment, illustrated in FIGS. 1-3, the tow adapter includes a bracket 102, a loop 104, and a hook 106. The bracket 102 includes a backplate 116 for securing the bracket to the towing vehicle and a base 120. The hook 106 is welded or otherwise fixed to the base 102. The loop 104 includes opposite first 110 and second 112 end portions. These opposite first and second end portions 110, 112 include openings for receiving the pin 108, about which the loop 104 can pivot. This allows the loop to be moved between a flush position where the tether may be secured to the hook and a normal position where the tether may be secured to the loop and hook. The bracket 102 further includes stops 114 for limiting the travel of the loop 104.

In a second step of the method, the bracket 102 of the tow adapter 100 is attached to the towing vehicle. The bracket 102 may be attached using fasteners, such as screws or bolts, or the bracket 102 may be welded or otherwise removably or permanently secured to the towing vehicle. According to the preferred embodiment, the bracket is attached by fasteners, such as bolts. The tow adapter 100 is secured to the towing vehicle so that in the flush position the loop 104 points downward towards the tires of the towing vehicle and in the normal position the loop 104 extends away from the vehicle.

In the next step of the method, a tether is attached to the device to be towed. The device to be towed may be a trailer, another vehicle, or other type of commonly towed object. The tether may be a strap, rope, chain, or other commonly used tether for securing towing vehicles to devices to be towed. The tether is secured to the device to be towed by tying, hooking, looping or otherwise attaching the tether to the device to be towed according to means well known in the art.

Finally, the tether is attached to the tow adapter. When the loop is in a normal position, the tether is secured to the loop by threading the tether over and through the loop and attaching the tether to the hook. The slack in the tether may then be drawn up, causing the tether to securely wrap about the hook and lock onto the hook, preventing the tether from accidentally becoming unhitched during towing. When the loop is in a flush position, the tether may either directly attach to the hook or may be wound around the loop. If directly attached to the hook, the tether may need to be held in place by hand until the slack is taken up between the towing vehicle and device to be towed.

Also disclosed in this application is a kit for a tow adapter 100. The tow adapter 100 is suitable for coupling a device to be towed to a towing vehicle. The kit includes a bracket 102 securable to a towing vehicle, the bracket including a U-shaped loop 104 having opposite first 110 and second 112 end portions for receiving a tether for towing the device to be towed and a hook 106 central of the opposite first 110 and second 112 end portions, the hook 106 pivotable relative to the hook 104. Fasteners are also provided suitable for fastening the bracket 102 to the vehicle. In one embodiment, the kit may also include a pin 108 for securing the loop 104 to the bracket 102 and allowing the loop to pivot about the pin relative to the bracket. The kit may also include a tether, such as a strap, chain, or rope, for connecting the towing vehicle to the device to be towed. The strap is adapted to connect the towing vehicle to the device to be towed by passing the tether over and through the loop and attaching the tether to the hook.

The bracket 102 of the above described kit may include stops for limiting travel of the loop 104 about the pin 108, a backplate 116 for connecting the bracket 102 to the towing vehicle, mounting holes 118 for receiving fasteners used to attach the bracket 102 to the towing vehicle, and a base 120 for supporting the hook 106. The hook 106 may be welded to the base 120 of the bracket, fixing the hook 106 in a first location.

According to the above described kit, the loop 104 of the tow adapter 100 is movable between a flush position and a normal position. The flush position may be useful alternatively for storing the tow hook in an unused position or for towing a device to be towed using only the hook 106. When the loop 104 is in the normal position, the tether may be secured to both the loop 104 and the hook 106 to enable towing of a device to be towed. The tether is secured to the loop 104 and hook 106 by passing the tether over and through the loop 104, forming at least one winding about the loop 104, and securing the tether to the hook 106.

The above-described tow adapter 100 includes a loop 104 and hook 106 which may be alternatively or collectively used to secure the towing vehicle to the device to be towed by means of the tether. The loop 104 and hook 106 may be selectively pivoted about the pin 108 so that it does not interfere with attaching the tether or towing the device to be towed.

In a first arrangement, the loop 104 and hook 106 are both used to attach the tether. According to this arrangement, the tether is passed through the loop, wrapped around the loop at least one time, and secured to the hook. The tether is then drawn taut, for example by advancing the towing vehicle to draw the slack out of the tether.

In a second arrangement, the loop 104 is moved to a flush position where it is not used. The tether is then secured to the hook 106, for example by passing a ring of a chain over the hook. Alternatively, the tether may be wrapped around the hook and secured thereto. As with the first arrangement, the tether is then drawn taught prior to towing the device to be towed, thereby securing the tether.

In a third embodiment, the hook 106 is moved out of the way and the loop is used for towing. In this embodiment, the tether is passed over the loop 104 and may be tied, wrapped, or otherwise secured in place. The tether in this case may be a hook on the end of a chain which engages the loop 104. Similar to the previous arrangements, once the tether is secured to the loop 104 the towing vehicle is moved to draw the tether taut, preventing the tether from slipping or breaking due to stress.

The various arrangements and embodiments discussed above are meant to be illustrative and not limiting of the disclosed invention. Any limitations to the scope of the invention will appear in the claims as allowed.

What is claimed is:

1. A tow adapter for coupling a device to be towed to a towing vehicle, the tow adapter comprising:
    a bracket adapted to be attached to the towing vehicle to support the tow adapter;
    a loop suitable to support a tether to enable the towing vehicle to tow the device to be towed, the loop having a first end portion and a second end portion each mounted to the bracket about a pivot such that the loop pivots relative to the bracket;
    the bracket including stops extending outwardly therefrom which limit an extent of travel of the loop about the pivot when the loop makes contact with the stops; and
    a hook mounted to the bracket, at least a portion of the hook capable of being disposed centrally within the loop, and wherein the loop and the hook are configured to enable the tether to thread through the loop and attach to the hook.

2. The tow adapter as claimed in claim 1, wherein the pivot comprises a pin.

3. The tow adapter as claimed in claim 2, wherein the pin comprises a threaded rod.

4. The tow adapter as claimed in claim 1, wherein the bracket is a single stamped piece having a portion including the stops for the loop.

5. The tow adapter as claimed in claim 1, wherein the bracket further includes a base and the hook is welded to the base.

6. A kit for a tow adapter suitable for coupling a device to be towed to a towing vehicle, the kit comprising:
    a bracket adapted to be fastened to the towing vehicle;
    a tether;
    a U-shaped loop having opposite first and second end portions each pivotally mounted to the bracket about a pivot, the loop for receiving the tether for towing the device to be towed;
    stops extending outwardly from the bracket which limit an extent of travel of the loop about the pivot when the loop makes contact with the stops;
    a hook mounted to the bracket, at least a portion of the hook capable of being disposed centrally within the loop, wherein the loop and the hook are configured to enable the tether to thread through the loop and attach to the hook; and
    fasteners suitable to fasten the bracket to the towing vehicle.

7. The kit as claimed in claim 6, wherein the first and second end portions of the loop each include an opening for receiving the pivot, and wherein the pivot comprises a pin.

8. The kit as claimed in claim 7, wherein the pin comprises a threaded rod.

9. The kit as claimed in claim 6, wherein the bracket comprises a single stamped piece having a portion including the stops for the loop.

10. The kit as claimed in claim 6, wherein the bracket includes a base and the hook is welded to the base.

11. The kit of claim 6, wherein the tether is one of a strap, a rope or a chain.

* * * * *